(12) United States Patent
Coffey et al.

(10) Patent No.: US 9,347,537 B2
(45) Date of Patent: May 24, 2016

(54) MULTI-MODE CONTINUOUSLY VARIABLE TRANSMISSION WITH SELECTABLE TRANSFER GEARS

(71) Applicant: GM Global Technology Operations LLC, Detroit, MI (US)

(72) Inventors: Dan Coffey, Howell, MI (US); Tejinder Singh, Commerce Township, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/477,415

(22) Filed: Sep. 4, 2014

(65) Prior Publication Data

US 2016/0069440 A1 Mar. 10, 2016

(51) Int. Cl.
*F16H 37/02* (2006.01)
*F16H 63/28* (2006.01)

(52) U.S. Cl.
CPC .............. *F16H 37/022* (2013.01); *F16H 63/28* (2013.01); *F16H 2200/20* (2013.01); *F16H 2702/02* (2013.01)

(58) Field of Classification Search
CPC ..... F16H 37/021; F16H 37/022; F16H 63/28; F16H 2200/20; F16H 2702/02; F16H 2037/023; F16H 2037/2037; F16H 2037/025; F16H 2037/028
See application file for complete search history.

(56) References Cited

U.S. PATENT DOCUMENTS

| 5,480,361 | A |  | 1/1996 | Murakami |  |
|---|---|---|---|---|---|
| 5,884,535 | A | * | 3/1999 | Fukunaga | F16H 37/022 74/730.1 |
| 6,997,831 | B2 | * | 2/2006 | Kanda | F16H 37/021 192/3.63 |
| 9,017,193 | B2 | * | 4/2015 | Kadokawa | F16H 9/18 474/28 |
| 2005/0197221 | A1 | * | 9/2005 | Nozawa | F16H 63/065 474/18 |
| 2005/0250606 | A1 | * | 11/2005 | Shioiri | F16H 9/125 474/18 |
| 2007/0117664 | A1 | * | 5/2007 | Shioiri | F16H 55/56 474/28 |
| 2007/0249440 | A1 | * | 10/2007 | Nozawa | F16H 55/56 474/28 |
| 2009/0062044 | A1 | * | 3/2009 | Shioiri | F16H 55/56 474/13 |
| 2011/0015833 | A1 | * | 1/2011 | Urata | F16H 37/022 701/51 |
| 2011/0312465 | A1 | * | 12/2011 | Ohashi | F16H 37/022 475/59 |
| 2012/0244993 | A1 | * | 9/2012 | Ishida | F16H 61/66259 477/39 |
| 2014/0335981 | A1 | * | 11/2014 | Kadokawa | F16H 55/56 474/8 |

\* cited by examiner

*Primary Examiner* — David J Hlavka

(57) ABSTRACT

A multi-mode continuously variable transmission (CVT) for a motor vehicle includes a transmission input member, a transmission output member, a planetary gear set, a forward clutch, a brake, and a continuously variable unit having a first pulley, a second pulley, and an endless member wrapped around the first pulley and the second pulley. A first transfer gear set is connected to the transmission output member. A second transfer gear set is connected to the transmission output member. A dual clutch assembly is provided having a first clutch and a second clutch, wherein the first clutch selectively connects the second pulley to the first transfer gear set and the second clutch selectively connects the second pulley to the second transfer gear set. The dual clutch assembly provides two modes or ranges of continuously variable speed ratios between the transmission input member and the transmission output member.

20 Claims, 2 Drawing Sheets

MULTI-MODE CONTINUOUSLY VARIABLE TRANSMISSION WITH SELECTABLE TRANSFER GEARS

FIELD

Figure 1:
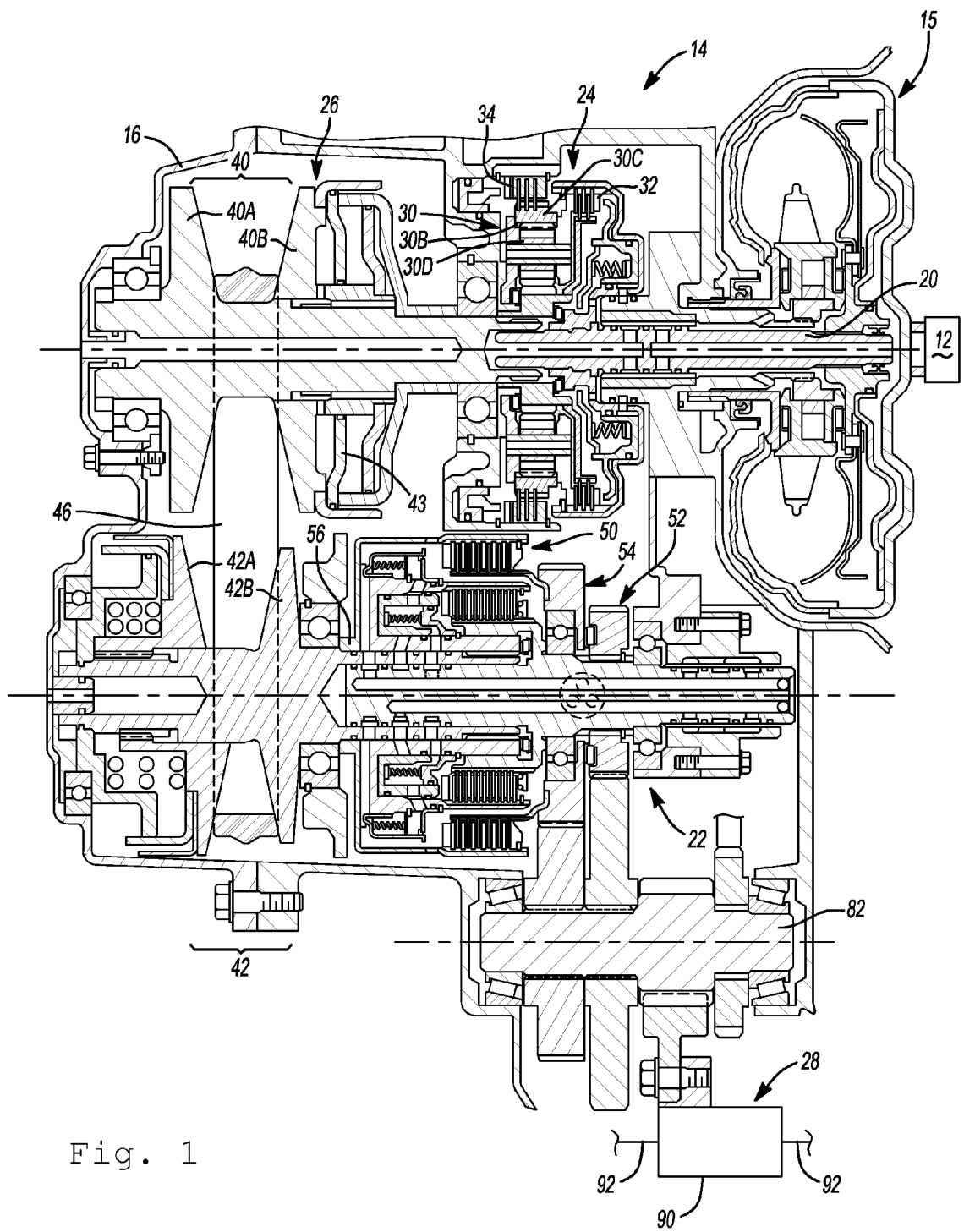

The present disclosure relates to automatic transmissions and more particularly to a multi-mode continuously variable transmission having selectable transfer gears.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

CVT axial length and mass significantly impact its power density and efficiency. Accordingly, there is a constant need for improved CVT designs that minimize axial length and mass while providing sufficient performance characteristics.

SUMMARY

A multi-mode CVT is provided for a motor vehicle. In one aspect of the present invention, the CVT includes a transmission input member, a transmission output member, a planetary gear set having first, second, and third members, wherein the second member of the planetary gear set is connected to the transmission input member, a forward clutch for selectively connecting the transmission input member to the first member of the planetary gear set, a brake for selectively connecting the third member of the planetary gear set to a stationary member, and a continuously variable unit having a first pulley connected for common rotation with one of the first, second, and third members of the planetary gear set, a second pulley, and an endless member wrapped around the first pulley and the second pulley. A first transfer gear set is connected to the transmission output member. A second transfer gear set is connected to the transmission output member. A dual clutch assembly is provided having a first clutch and a second clutch, wherein the first clutch selectively connects the second pulley to the first transfer gear set and the second clutch selectively connects the second pulley to the second transfer gear set. The planetary gear set arrangement controls forward and reverse speed selections while the dual clutch assembly provides two modes or ranges of continuously variable speed ratios between the transmission input member and the transmission output member.

In another aspect of the present invention, the first transfer gear set includes a first drive gear in mesh with a first driven gear, the first drive gear connected to the first clutch and the first driven gear connected to the transmission output member.

In another aspect of the present invention, the second transfer gear set includes a second drive gear in mesh with a second driven gear, the second drive gear connected to the second clutch and the second driven gear connected to the transmission output member.

In another aspect of the present invention, the first drive gear is co-planar with the first driven gear and the second drive gear is co-planar with the second driven gear.

In another aspect of the present invention, the dual clutch includes a clutch housing, an inner clutch hub, and an outer clutch hub, wherein the first clutch is connected between the inner clutch hub and the clutch housing, and the second clutch is connected between the outer clutch hub and the clutch housing.

In another aspect of the present invention, the inner clutch hub includes a flange and the first clutch is connected to the flange.

In another aspect of the present invention, the inner clutch hub includes a first end portion and a second end portion each on opposite sides of the flange, and wherein the first drive gear is connected to the second end portion.

In another aspect of the present invention, the first drive gear is coaxial with the inner clutch hub and the second drive gear is supported on the inner clutch hub by at least one bearing.

In another aspect of the present invention, the first end portion of the inner clutch hub is disposed within the second pulley assembly.

In another aspect of the present invention, the clutch housing defines inner and outer cavities, and the first clutch and flange are disposed in the inner cavity and the second clutch and outer clutch hub are disposed in the outer cavity.

In another aspect of the present invention, the first pulley is connected for common rotation with the first member of the planetary gear set.

In another aspect of the present invention, the first member of the first planetary gear set is a sun gear, the second member of the first planetary gear set is a planet carrier member, and the third member of the first planetary gear set is a ring gear member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
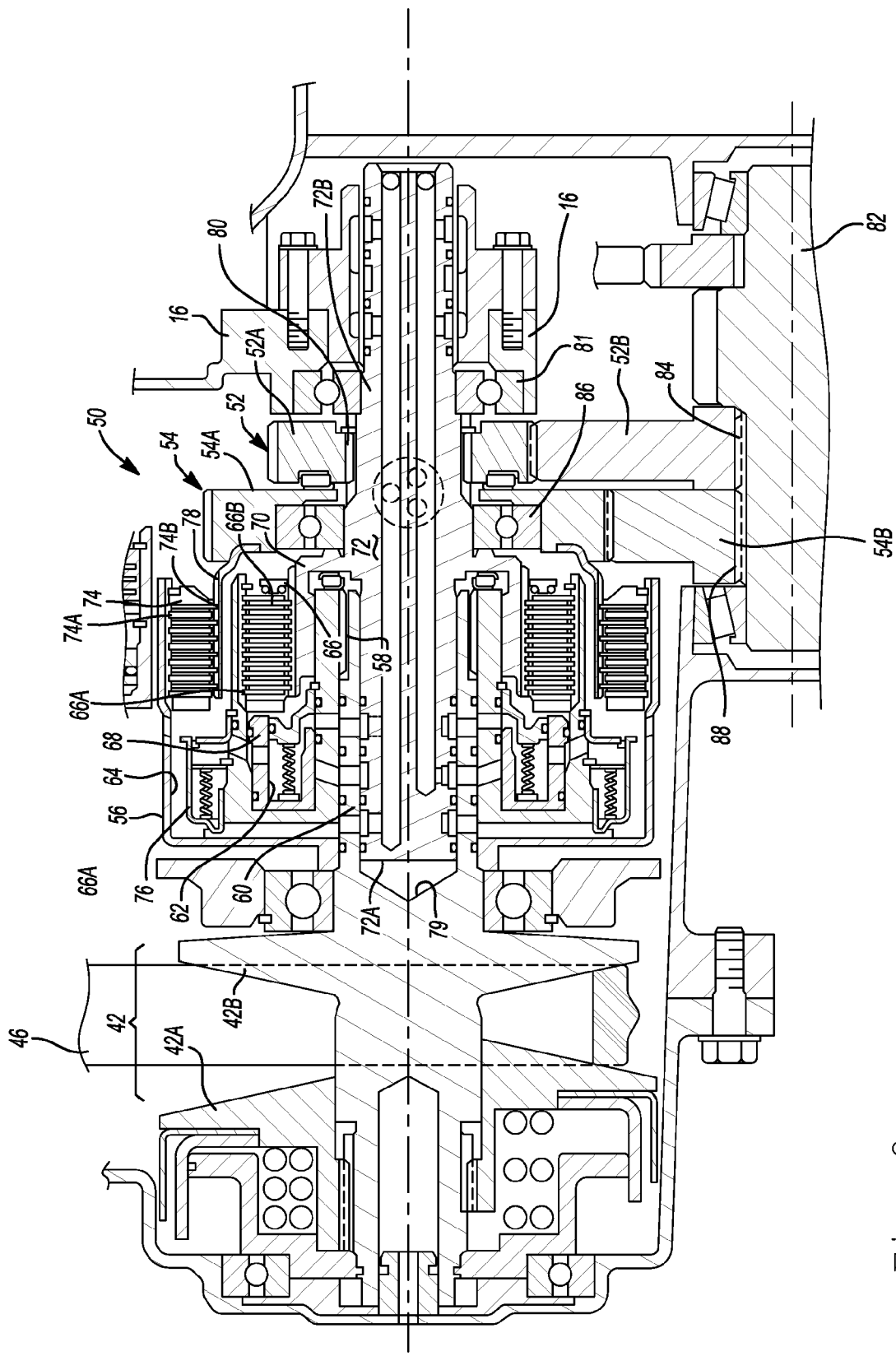

FIG. 1 is a schematic and cross-section view of a powertrain according to the principles of the present invention; and FIG. 2 is an enlarged portion of the cross-section view of the powertrain shown in FIG. 1.

DETAILED DESCRIPTION

The following description is merely exemplary in nature and is not intended to limit the present disclosure, application, or uses.

With reference to FIG. 1, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a torque converter 15. It should be appreciated that other starting devices may be employed, such as a launch clutch.

The transmission 14 is a variable diameter pulley or sheave drive continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission dual output transfer gear assembly (transmission output assembly) 22. The transmission input shaft 20 is functionally interconnected with the engine 12 through the torque converter 15 and receives input torque or power from the engine 12. Connected between the transmission input shaft 20 and the transmission output assembly 22 is a planetary gear set arrangement 24 and a continuously variable unit or pulley assembly 26. The planetary gear set arrangement 24 and the continuously variable unit 26 cooperate to provide forward and reverse speed ratios between the transmission input shaft 20 and the transmission output assembly 22. The transmission output assembly 22 provides two modes or ranges of speed ratios to a final drive unit 28, as will be described below. The final drive unit 28 may include a differential, axle shafts, and road wheels (not shown).

The transmission input shaft 20 is connected to the planetary gear set arrangement 24. The planetary gear set arrangement 24 includes a planetary gear set 30 having a sun gear member 30A, a planet carrier member 30B, and a ring gear member 30C. The planet carrier member 30B rotatably supports a set of planet gears 30D (only two of which are shown). In one example, the planetary gear set arrangement 24 is configured as a compound planetary gear set where the set of planet gears 30D include a first subset of planet gears each configured to intermesh with the sun gear member 30A and a second subset of planet gears each configured to intermesh with both the first subset of planet gears and with the ring gear member 30C. In another example, the planetary gear set arrangement 24 is configured as a simple planetary gear set where the planet gears 30D are each configured to intermesh with both the sun gear member 30A and the ring gear member 30C. The sun gear member 30A is selectively connectable for common rotation with the transmission input shaft 20 by a forward clutch 32 and the sun gear member 30A is connected for common rotation with the continuously variable unit 26. The carrier member 30B is connected for common rotation with the transmission input member 20. The ring gear member 30C is selectively connectable to the transmission housing 16 by a brake 34.

The forward clutch 32 and the brake 34 are friction, dog or synchronizer type mechanisms or the like. Engagement of the forward clutch 32 provides a forward drive torque while engagement of the brake 34 provides a reverse drive torque.

The pulley assembly 26 includes a first pulley or sheave pair 40 and a second pulley or sheave pair 42. The first pulley 40 includes a first truncated conical sheave or member 40A and second truncated conical sheave or member 40B in axial alignment with the first truncated conical sheave 40A. The second sheave 40B is directly connected for rotation with the sun gear member 30A. The second sheave 40B is moveable axially relative to the first sheave 40A by a hydraulic controlled piston 43 or other actuating system. It should be appreciated that the sheaves 40A and 40B may be axially switched without departing from the scope of the present invention.

The second pulley 42 includes a first truncated conical sheave or member 42A and second truncated conical sheave or member 42B in axial alignment with the first truncated conical sheave 42A. The second sheave 42B is directly connected for rotation with the transmission output assembly 22. The first sheave 42A is moveable axially relative to the second sheave 42B by a hydraulic controlled piston 45 or other actuating system. It should be appreciated that the sheaves 42A and 42B may be axially switched without departing from the scope of the present invention.

A torque transmitting belt or chain 46 having an approximately V-shaped cross section is mounted between the first pulley 40 and the second pulley 42. It should be appreciated that other types of belts, including positive engagement devices, may be employed without departing from the scope of the present invention. Drive torque communicated from the transmission input shaft 20 and planetary gear set assembly 24 is transferred via friction between the sheaves 40A and 40B and the belt 46. The ratio of the input pulley 40 to the output pulley 42 is adjusted by varying the spacing between the sheaves 40A and 40B and between the sheaves 42A and 42B. For example, to change the ratio between the pulleys 40 and 42, the axial distance between sheaves 40A and 40B may be reduced by moving sheave 40B towards sheave 42A while simultaneously the axial distance between sheave 42A and 42B may be increased by moving sheave 42A away from sheave 42B. Due to the V-shaped cross section of the belt 46, the belt 46 rides higher on the first pulley 40 and lower on the second pulley 42. Therefore the effective diameters of the pulleys 40 and 42 change, which in turn changes the overall gear ratio between the first pulley 40 and the second pulley 42. Since the radial distance between the pulleys 40 and 42 and the length of the belt 46 is constant, the movement of the sheaves 40A and 42A must occur simultaneously in order to maintain the proper amount of tension on the belt 46 to assure torque is transferred from the pulleys 40, 42 to the belt 46.

Turning to FIG. 2, the second pulley 42 of the continuously variable unit 26 transfers torque to the transmission output assembly 22. The transmission output assembly 22 includes a dual clutch 50 connected to a first transfer gear set 52 and a second transfer gear set 54. The dual clutch 50 includes a dual clutch housing 56 connected via a spline connection 58 to an elongated shaft portion 60 of the second sheave 42B. The dual clutch housing 56 defines an inner housing 62 and an outer housing 64 disposed radially outward of the inner housing 62. The inner housing 62 supports an inner clutch pack 66 and a hydraulically actuated piston 68. The inner clutch pack 66 includes interleaved friction or reaction plates 66A, 66B. The plates 66A are slidably splined or connected to the inner housing 62. The plates 66B are slidably splined or connected to a flange portion 70 of an inner clutch hub 72. The hydraulically actuated piston 68 selectively engages the inner clutch pack 66 by compressing the interleaved plates 66A, 66B together so that torque is transferred from the dual clutch housing 56 to the inner clutch hub 72.

The outer clutch housing 64 supports an outer clutch pack 74 and a hydraulically actuated piston 76. The outer clutch pack 74 includes interleaved friction or reaction plates 74A, 74B. The plates 74A are slidably splined or connected to the outer housing 64. The plates 74B are slidably splined or connected to an outer clutch hub 78. The hydraulically actuated piston 76 selectively engages the outer clutch pack 74 by compressing the interleaved plates 74A, 74B together so that torque is transferred from the dual clutch housing 56 to the outer clutch hub 78.

The inner clutch hub 72 includes a first end portion 72A and a second end portion 72B on either axial side of the flange 70. The first end portion 72A is supported within a cavity 79 disposed in the second sheave 42B. The second end portion 72B is disposed outside the cavity 79 and is supported by the transmission housing 16 via bearings 81.

The first transfer gear set 52 includes a drive gear 52A in mesh with a driven gear 52B. The drive gear 52A is coaxial with the inner clutch hub 72 and is rotationally connected to the inner clutch hub 72 by a spline connection 80 disposed on the second end portion 72B. The driven gear 52B is coaxial with an intermediate member or transmission output member 82 and is rotationally connected to the intermediate member 82 by a spline connection 84.

The second transfer gear set 54 includes a drive gear 54A in mesh with a driven gear 54B. The drive gear 54A is coaxial with the inner clutch hub 72 and is rotationally supported on second end portion 72B of the inner clutch hub 72 by bearings 86. The drive gear 54A is rotationally connected to the outer clutch hub 78. The driven gear 54B is coaxial with the intermediate member 82 and is rotationally connected to the intermediate member 82 by a spline connection 88.

Returning to FIG. 1, the intermediate member 82 is connected to the final drive unit 28. The final drive unit 28 may include a differential 90 and axles 92 that provide drive torque to a set of road wheels (not shown). During operation of the transmission 14, engine speed and torque is supplied through the torque converter 15 to the planetary gear assembly 24. Engagement of the forward clutch 32 and the brake 34 selectively provide forward and reverse rotations. Speed and torque is transferred from the planetary gear assembly 24 to the continuously variable unit 26 where movement of the pulleys 40, 42 provides a range of continuous forward or reverse speed ratios. The speed and torque output from the continuously variable unit 26 is then selectively transferred to one of the first transfer gear set 52 or the second transfer gear set 54 by selectively engaging one of the clutches 66, 74 of the dual clutch assembly 50. Each of the transfer gear sets 52, 54 provides a step up or step down in speed ratio thus providing two modes or ranges of continuously variable forward or reverse speed ratios to the intermediate member 82. Speed and torque are then transferred from the intermediate member 82 to the final drive unit 28 to propel the motor vehicle.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission for a motor vehicle comprising:
    a transmission input member;
    a transmission output member;
    a planetary gear set having first, second, and third members, wherein the second member of the planetary gear set is connected to the transmission input member;
    a forward clutch for selectively connecting the transmission input member to the first member of the planetary gear set;
    a brake for selectively connecting the third member of the planetary gear set to a stationary member;
    a continuously variable unit having a first pulley connected for common rotation with one of the first, second, and third members of the planetary gear set, a second pulley, and an endless member wrapped around the first pulley and the second pulley;
    a first transfer gear set connected to the transmission output member;
    a second transfer gear set connected to the transmission output member; and
    a dual clutch assembly having a first clutch and a second clutch, wherein the first clutch selectively connects the second pulley to the first transfer gear set and the second clutch selectively connects the second pulley to the second transfer gear set.

2. The transmission of claim 1 wherein the first transfer gear set includes a first drive gear in mesh with a first driven gear, the first drive gear connected to the first clutch and the first driven gear connected to the transmission output member.

3. The transmission of claim 2 wherein the second transfer gear set includes a second drive gear in mesh with a second driven gear, the second drive gear connected to the second clutch and the second driven gear connected to the transmission output member.

4. The transmission of claim 3 wherein the first drive gear is co-planar with the first driven gear and the second drive gear is co-planar with the second driven gear.

5. A transmission for a motor vehicle comprising:
    a transmission input member;
    a transmission output member;
    a planetary gear set having first, second, and third members, wherein the second member of the planetary gear set is connected to the transmission input member;
    a forward clutch for selectively connecting the transmission input member to the first member of the planetary gear set;
    a brake for selectively connecting the third member of the planetary gear set to a stationary member;
    a continuously variable unit having a first pulley connected for common rotation with one of the first, second, and third members of the planetary gear set, a second pulley, and an endless member wrapped around the first pulley and the second pulley;
    a first transfer gear set connected to the transmission output member;
    a second transfer gear set connected to the transmission output member; and
    a dual clutch assembly having a first clutch and a second clutch, wherein the first clutch selectively connects the second pulley to the first transfer gear set and the second clutch selectively connects the second pulley to the second transfer gear set,
    wherein the first transfer gear set includes a first drive gear in mesh with a first driven gear, the first drive gear connected to the first clutch and the first driven pear connected to the transmission output member,
    wherein the second transfer gear set includes a second drive gear in mesh with a second driven gear, the second drive gear connected to the second clutch and the second driven gear connected to the transmission output member,
    wherein the first drive gear is co-planar with the first driven gear and the second drive gear is co-planar with the second driven gear,
    wherein the dual clutch includes a clutch housing, an inner clutch hub, and an outer clutch hub, wherein the first clutch is connected between the inner clutch hub and the clutch housing, and the second clutch is connected between the outer clutch hub and the clutch housing.

6. The transmission of claim 5 wherein the inner clutch hub includes a flange and the first clutch is connected to the flange.

7. The transmission of claim 6 wherein the inner clutch hub includes a first end portion and a second end portion each on opposite sides of the flange, and wherein the first drive gear is connected to the second end portion.

8. The transmission of claim 7 wherein the first drive gear is coaxial with the inner clutch hub and the second drive gear is supported on the inner clutch hub by at least one bearing.

9. The transmission of claim 7 wherein the first end portion of the inner clutch hub is disposed within the second pulley assembly.

10. The transmission of claim 7 wherein the clutch housing defines inner and outer cavities, and the first clutch and flange are disposed in the inner cavity and the second clutch and outer clutch hub are disposed in the outer cavity.

11. The transmission of claim 1 wherein the first pulley is connected for common rotation with the first member of the planetary gear set.

12. A transmission for a motor vehicle comprising:
a transmission input member;
a transmission output member;
a planetary gear set having first, second, and third members, wherein the second member of the planetary gear set is connected to the transmission input member;
a forward clutch for selectively connecting the transmission input member to the first member of the planetary gear set;
a brake for selectively connecting the third member of the planetary gear set to a stationary member;
a continuously variable unit having a first pulley connected for common rotation with one of the first, second, and third members of the planetary gear set, a second pulley, and an endless member wrapped around the first pulley and the second pulley;
a first transfer gear set connected to the transmission output member;
a second transfer gear set connected to the transmission output member; and
a dual clutch assembly having a first clutch and a second clutch, wherein the first clutch selectively connects the second pulley to the first transfer gear set and the second clutch selectively connects the second pulley to the second transfer gear set,
wherein the first pulley is connected for common rotation with the first member of the planetary gear set,
wherein the first planetary gear set is a compound planetary gear set and the first member of the first planetary gear set is a sun gear, the second member of the first planetary gear set is a planet carrier member, and the third member of the first planetary gear set is a ring gear member.

13. A transmission for a motor vehicle comprising:
a transmission input member;
a transmission output member;
a planetary gear set having first, second, and third members, wherein the second member of the planetary gear set is connected to the transmission input member;
a forward clutch for selectively connecting the transmission input member to the first member of the planetary gear set;
a brake for selectively connecting the third member of the planetary gear set to a stationary member;
a continuously variable unit having a first pulley connected for common rotation with one of the first, second, and third members of the planetary gear set, a second pulley, and an endless member wrapped around the first pulley and the second pulley;
a dual clutch assembly having a clutch housing connected to the second pulley, an inner clutch hub, a first clutch for selectively rotationally coupling the clutch housing with the inner clutch hub, an outer clutch hub, and a second clutch for selectively rotationally coupling the clutch housing with the outer clutch hub;
a first transfer gear set having a first drive gear coaxial with the inner clutch hub and in mesh with a first driven gear coaxial with the transmission output shaft, wherein the first drive gear is connected to the inner clutch hub and the first driven gear is connected to the transmission output member; and
a second transfer gear set having a second drive gear coaxial with the inner clutch hub and in mesh with a second driven gear coaxial with the transmission output shaft, wherein the second drive gear is rotationally connected to the outer clutch hub and freely rotationally supported on the inner clutch hub and the first driven gear is connected to the transmission output member.

14. The transmission of claim 13 wherein the first drive gear is co-planar with the first driven gear and the second drive gear is co-planar with the second driven gear.

15. The transmission of claim 14 wherein the inner clutch hub includes a flange and the first clutch is connected to the flange.

16. The transmission of claim 15 wherein the inner clutch hub includes a first end portion and a second end portion each on opposite sides of the flange, and wherein the first drive gear is connected to the second end portion.

17. The transmission of claim 16 wherein the first end portion of the inner clutch hub is disposed within the second pulley assembly.

18. The transmission of claim 17 wherein the clutch housing defines inner and outer cavities, and the first clutch and flange are disposed in the inner cavity and the second clutch and outer clutch hub are disposed in the outer cavity.

19. The transmission of claim 13 wherein the first pulley is connected for common rotation with the first member of the planetary gear set.

20. The transmission of claim 19 wherein the first member of the first planetary gear set is a sun gear, the second member of the first planetary gear set is a planet carrier member, and the third member of the first planetary gear set is a ring gear member.

* * * * *